United States Patent [19]

Shinoura et al.

[11] Patent Number: 5,570,251

[45] Date of Patent: Oct. 29, 1996

[54] THIN FILM MAGNETIC DEVICE WITH PLURAL VALVES OF MAGNETOSTRICTION

[75] Inventors: Osamu Shinoura, Chiba; Tsutomu Koyanagi, Nagano; Hiroshi Chihara, Chiba; Makoto Yoshida, Nagano; Tsutomu Chou, Chiba, all of Japan

[73] Assignee: TDK Corporation, Tokyo, Japan

[21] Appl. No.: 271,731

[22] Filed: Jul. 7, 1994

[30] Foreign Application Priority Data

Jul. 7, 1993 [JP] Japan .................................. 5-167776
Mar. 18, 1994 [JP] Japan .................................. 6-048572

[51] Int. Cl.$^6$ ............................ G11B 5/127; G11B 5/147
[52] U.S. Cl. ............................ 360/126; 360/125; 360/113
[58] Field of Search ................................... 360/126, 125, 360/113

[56] References Cited

U.S. PATENT DOCUMENTS

| 3,344,237 | 9/1967 | Gregg . | |
|---|---|---|---|
| 4,242,710 | 12/1980 | Hempstead et al. | 360/126 |
| 4,663,607 | 5/1987 | Kitada et al. | 360/113 |
| 4,750,072 | 6/1988 | Takagi | 360/126 |
| 4,787,003 | 11/1988 | Nakamura et al. | 360/125 |
| 5,091,266 | 2/1992 | Omata | 360/125 |
| 5,311,386 | 5/1994 | Mallary | 360/126 |

FOREIGN PATENT DOCUMENTS

| 1-180994 | 7/1989 | Japan . |
|---|---|---|
| 1-264620 | 10/1989 | Japan . |
| 1-264617 | 10/1989 | Japan . |
| 3-8004 | 2/1991 | Japan . |
| 4-195809 | 7/1992 | Japan . |
| 5-76682 | 10/1993 | Japan . |

OTHER PUBLICATIONS

IEEE Transactions on Magnetics, vol. 25, No. 5, Sep. 1989, R. E. Jones, Jr., et al., "Domain Structures Due to Induce Anisotropy and Stresses in Film Heads", pp. 3203–3205.

IEEE Transactions on Magnetics, vol. MAG–7, No. 1, Mar. 1971, Jean–Pierre Lazzari, et al., "Integrated Magnetic Recording Heads", pp. 146–150.

Journal of Japanese Applied Magnetism Society, vol. 8, No. 2, 1984, S. Marishige, et al., pp. 65–68, "Measurements of Magnetization Processes of Thin Film Heads Using Micro-–Kerr Method".

Primary Examiner—John H. Wolff
Assistant Examiner—Adriana Giordana
Attorney, Agent, or Firm—Oblon, Spivak, McClelland, Maier, & Neustadt, P.C.

[57] ABSTRACT

A thin film magnetic device includes an organic insulating layer of a raised shape and a soft magnetic alloy thin film covering the organic insulating layer. The soft magnetic alloy thin film has a composition which varies to provide a magneto-striction distribution such that magnetostriction is positive or negative in a top region and negative or positive in a bottom region of the raised shape whereby the device has uniaxial anisotropy in a desired direction.

26 Claims, 6 Drawing Sheets

THIN FILM MAGNETIC DEVICE WITH PLURAL VALVES OF MAGNETOSTRICTION

BACKGROUND OF THE INVENTION

1. Field of Invention

This invention relates to a thin film magnetic device, and more particularly, to a thin film magnetic head.

1. Prior Art with the salient advance of photolithography and thin film formation technology, thin film magnetic devices are currently considered promising in a variety of applications. For example, there is a demand for magnetic heads of higher performance which meet the requirements of high density magnetic recording. Compared to ferrite heads which are fabricated by machining a bulk material to form a magnetic pole, thin film magnetic heads which are fabricated by applying a fine processing technique are likely to meet such requirements and thus find rapid widespread use.

Magnetostriction is one of the important properties that must be met by the magnetic film forming the magnetic pole of a thin film magnetic head. There are two reasons. First, both magnetostriction and crystal magnetic anisotropy must be reduced in order to provide a high magnetic permeability. Magnetostriction of a reduced magnitude is then required.

The other reason is to reduce Barkhausen effect. Japanese Patent Publication (JP-B) No. 7401/1989 proposes, in conjunction with a thin film magnetic head having a magnetic pole of Permalloy, to use a magnetic thin film of a composition having negative magnetostriction, for example, a magnetic thin film of Permalloy with a Ni content of 81 to 84% by weight having a magnetostriction value of $-1 \times 10^{-6}$ to $-5 \times 10^{-6}$. Similarly, Japanese Patent Application Kokai (JP-A) No. 264620/1989 states that a magnetostriction value in the range of $-1 \times 10^{-6}$ to $-1 \times 10^{-5}$ is preferred and a Permalloy composition with a Ni content of 81 to 83% by weight is satisfactory to this end. As described in J. P. Lazzari et al., IEEE Transactions on Magnetics, MAG-7, 146 (1971), it is believed that the magnetization process should be a magnetization rotation mode rather than a magnetic wall transfer mode entailing Barkhausen noise; to this end, it is critical to impart uniaxial anisotropy having an axis of difficult magnetization in a magnetic path direction; and to this end, magnetostriction of a negative reduced value as mentioned above is necessary.

JP-A 180994/1989 discloses how to prepare a magnetic thin film of a uniform composition by taking into account the characteristics of a plating method. Since the composition range which is able to exhibit magnetostriction of a small negative value as proposed above is limited as narrow as (82 ±1) wt %, JP-A 180994/1989 is designed to establish a uniform composition distribution in the magnetic pole despite a current density distribution varying with a shape and other factors.

Also JP-A 76682/1993 discloses a thin film magnetic head comprising a magnetic pole having a magnetostriction distribution such that magnetostriction is opposite between peripheral and central portions. More specifically, the pattern peripheral portion has negative magnetostriction and the pattern central portion of a large surface area has positive magnetostriction. What is considered therein is only the stress acting on a planar pattern at the periphery. Then the pole tip portion has negative magnetostriction in a peripheral portion and positive magnetostriction in a central portion thereof. Additionally, both the upper and lower magnetic layers have the same magnetostriction distribution.

Journal of Japanese Applied Magnetism Society, Vol. 8, No. 2, 65 (1984) states that the anisotropy of a NiFe film formed on a step of polyimide resin is explained as stress induced anisotropy. It is uncertain whether the stress is compressive or tensile. It is described that a film of positive magneto-striction undesirably experiences a substantial change of the magnetization process at the step.

JP-A 264617/1989 discloses a thin film magnetic head wherein a gap layer or a stress relieving layer in the form of a non-magnetic metal layer is formed on an insulating layer for the purpose of mitigating the stress applied from the insulating layer to the upper magnetic pole for restraining any disturbance of a magnetic domain structure.

JP-A 195809/1992 discloses a thin film magnetic head including a magnetic core having an alloy composition which is different between a medium facing portion and a back contact peripheral portion. It is intended to vary the anisotropy constant of the alloy itself, with no reference being made to the magnetoelastic effect responsive to stresses. Then both the upper and lower magnetic poles are similarly constructed of an alloy composition which is different between a medium facing portion and a back contact peripheral portion.

As mentioned above, the prior art focused at providing induction magnetic anisotropy by forming a film in a magnetic applied field and paid attention to minimization of the disturbance-causing anisotropy resulting from the magnetoelastic effect, that is, to minimize magnetostriction within a negative value range and to minimize the magnetostriction distribution within the magnetic pole. All the stresses considered heretofore are tensile stresses while no consideration has been made to the compressive stresses applied from the organic resist layer during annealing after film formation. Then as a matter of course, the designers of thin film magnetic heads has paid no attention to the ratio of yoke portion width y to contact hole width x of the upper magnetic pole, y/x, which dictates the direction of a compressive stress applied to the upper magnetic pole. However, such techniques are difficult to manufacture thin film magnetic heads with minimal noise in a consistent manner.

Various thin film magnetic devices favor magnetic poles and magnetic cores which are configured to a ring shape capable of affording a closed magnetic circuit. In the manufacture of such thin film magnetic devices, it is necessary that a pattern including a multiplicity of fine magnetic film rings be formed on a substrate or wafer, and each fine magnetic film ring be given a magnetic path in its circumferential direction. To this end, it is necessary to impart anisotropy having an axis of difficult magnetization in a circumferential direction. This cannot be achieved by any available means, with a lowering of manufacturing efficiency.

SUMMARY OF THE INVENTION

An object of the present invention is to provide a high performance thin film magnetic device including a fine pattern soft magnetic thin film having anisotropy in a desired direction. Another object of the invention is to provide a thin film magnetic head exhibiting such anisotropy.

The present invention provides a thin film magnetic device comprising a layer of a raised shape including an organic insulating layer and a soft magnetic alloy thin film covering the raised layer. The soft magnetic alloy thin film has a magnetostriction distribution varying from positive to negative magnetostriction values such that the thin film has positive magnetostriction in a top region of the raised shape, negative magnetostriction in a bottom region of the raised shape, and zero magnetostriction in an intermediate region between the top and bottom regions. Alternatively, the soft magnetic alloy thin film has a magnetostriction distribution varying from positive to negative magnetostriction values such that the thin film has negative magnetostriction in a top region of the raised shape, positive magnetostriction in a bottom region of the raised shape, and zero magnetostriction in an intermediate region between the top and bottom regions.

Preferably, the soft magnetic alloy thin film in the region where magnetostriction is positive receives a compressive stress in a magnetic path direction, and the soft magnetic alloy thin film in the region where magnetostriction is negative receives a tensile stress in the magnetic path direction.

Alternatively, the soft magnetic alloy thin film in the region where magnetostriction is negative receives a compressive stress perpendicular to a magnetic path, and the soft magnetic alloy thin film in the region where magnetostriction is positive receives a tensile stress perpendicular to a magnetic path.

Preferably, the magnetostriction has a magnitude within $1 \times 10^{-5}$.

Preferably, the soft magnetic alloy thin film is formed by electroplating.

Often the thin film magnetic device further includes a support on which the raised layer is formed. The soft magnetic alloy thin film is in direct joint with the support.

Typically the organic insulating layer is made of a resin and annealed at 200° C. or higher after formation of the soft magnetic alloy thin film thereon.

Desirably the thin film magnetic device is used as a thin film magnetic head. The head includes a lower magnetic pole in the form of a soft magnetic alloy thin film, a gap layer covering a part of the lower magnetic pole, an organic insulating layer of a raised shape formed on a part of the gap layer and having a coil layer embedded therein, and an upper magnetic pole in the form of a soft magnetic alloy thin film formed on the lower magnetic pole, the gap layer and the organic insulating layer. The soft magnetic alloy thin film of the lower magnetic pole has negative magnetostriction. A first portion of the soft magnetic alloy thin film of the upper magnetic pole which is disposed contiguous and adjacent to the lower magnetic pole has negative magnetostriction. A second portion of the soft magnetic alloy thin film of the upper magnetic pole which corresponds to a top region of the organic insulating layer has positive magnetostriction. A third portion of the soft magnetic alloy thin film of the upper magnetic pole which is disposed intermediate the first and second portions has zero magnetostriction.

Preferably, the upper and lower magnetic poles include yoke portions opposed through the coil layer, pole portions joined together through a gap and disposed close to each other, and contact hole portions joined to each other directly. The yoke portion of the upper magnetic pole is of a positive magnetostriction composition. The pole portion of the upper magnetic pole and the yoke and pole portions of the lower magnetic pole are of a negative magnetostriction composition.

Also preferably, the magnetic pole includes at least one layer of soft magnetic alloy thin film of a negative magnetostriction composition and at least one layer of soft magnetic alloy thin film of a positive magnetostriction composition. The pole portions of the upper and lower magnetic poles and the yoke portion of the lower magnetic pole are constructed solely of soft magnetic alloy thin film of a negative magnetostriction composition.

Preferably, the magnetostriction has a magnitude within $1 \times 10^{-5}$.

Preferably, the soft magnetic alloy thin film is formed by electroplating. Preferably, the contact hole and yoke portions of the upper magnetic pole have a width x and y, respectively, wherein $2x > y \geq x$.

The head may further include a ceramic substrate, the lower magnetic pole being formed on the ceramic substrate directly or through an undercoat layer.

Typically the organic insulating layer is a resist film. The resist film may be annealed at 200° C. or higher after formation of the upper magnetic pole thereon.

BENEFITS OF THE INVENTION

As opposed to the prior art technology considering it ideal that a magnetic film forming a magnetic core has negative magnetostriction in all regions thereof and a more uniform composition distribution (or magnetostriction distribution) in the core, the present invention is characterized by establishing in the magnetic pole a composition distribution having magnetostriction varying from positive to negative values.

More particularly, magnetostriction is zero in an intermediate region of the raised or convex configuration between the top and bottom regions. Then anisotropy is imparted in a desired direction by utilizing the anisotropy resulting from the magnetoelastic effect which takes full advantage of a compressive stress. The thin film magnetic device of the invention is designed such that a compressive stress is exerted in a positive magnetostriction region and a tensile stress is exerted in a negative magnetostriction region or vice versa, thereby imparting anisotropy in a desired direction.

In the preferred embodiment wherein the magnetostriction has a magnitude or absolute value of up to $1 \times 10^{-5}$ that is, within $\pm 1 \times 10^{-5}$, the device experiences minimal influence of magnetostriction during operation and possesses optimum anisotropy, resulting in improved operating efficiency and noise suppression. In the preferred embodiment wherein the soft magnetic alloy thin film is deposited by electroplating, the manufacturing cost is low and the devices exhibit consistent magnetic properties.

The thin film magnetic device of the invention is best suited as a thin film magnetic head. In the preferred embodiment, the head includes upper and lower magnetic poles sandwiching a coil layer, the lower magnetic pole and the region of the upper magnetic pole which is disposed adjacent to the lower magnetic pole are formed of an alloy composition having negative magnetostriction, the region of the upper magnetic pole which is separated from the lower magnetic pole through the coil layer is formed of an alloy composition having positive magnetostriction, and an intermediate region of the upper magnetic pole is formed of an alloy composition having zero magnetostriction. Then during reading operation of the thin film magnetic head, the alloy composition of the magnetic pole has approximately zero magnetostriction as a whole with respect to the magnetization upon reading. Then reading noise is reduced.

In the preferred thin film magnetic head which includes upper and lower magnetic poles having yoke portions sandwiching a coil layer, pole portions and contact hole portions which are disposed closely or joined together, wherein the yoke portion of the upper magnetic pole is of a positive magnetostriction composition, the pole and contact hole portions of the upper magnetic pole are of a negative magnetostriction composition, during reading operation, the yoke and pole portions as a whole have approximately zero magnetostriction with respect to the magnetization upon reading, ensuring further reduced noise on reading.

In the further preferred embodiment, the upper magnetic pole includes at least one layer of negative magnetostriction composition film and at least one layer of positive magnetostriction composition film, and the pole portion of the upper magnetic pole is constructed solely of a negative magnetostriction composition film. Then during reading operation of the thin film magnetic head, the pole portion has an appropriate magnetostriction distribution with respect to the magnetization upon reading, resulting in minimized reading noise. Since the magnetic pole consists of a plurality of layers, the layered film exhibits stable magnetic properties. Also in this embodiment, if the magnetostriction has a magnitude within $1\times10^{-5}$, the head experiences minimal influence of magnetostriction of the magnetic pole on the magnetization for reading during reading operation of the head and possesses optimum anisotropy, resulting in improved operating efficiency and noise suppression. In the preferred embodiment wherein the soft magnetic alloy thin film is deposited by electroplating, the manufacturing cost is low and the devices exhibit consistent magnetic properties. Setting the contact hole portion width x and yoke portion width y of the upper magnetic pole so as to meet $2x > y$ facilitates to impart anisotropy in a magnetic path direction.

BRIEF DESCRIPTION OF THE DRAWINGS

The above and other objects and features will be better understood by reading the following description taken in conjunction with the accompanying drawings.

DESCRIPTION OF THE PREFERRED EMBODIMENTS

Typical products embodying the thin film magnetic device of the present invention include thin film magnetic heads and thin film magnetic transformers. The following description refers to the structure of a thin film magnetic head as a typical embodiment.

Figure 1:
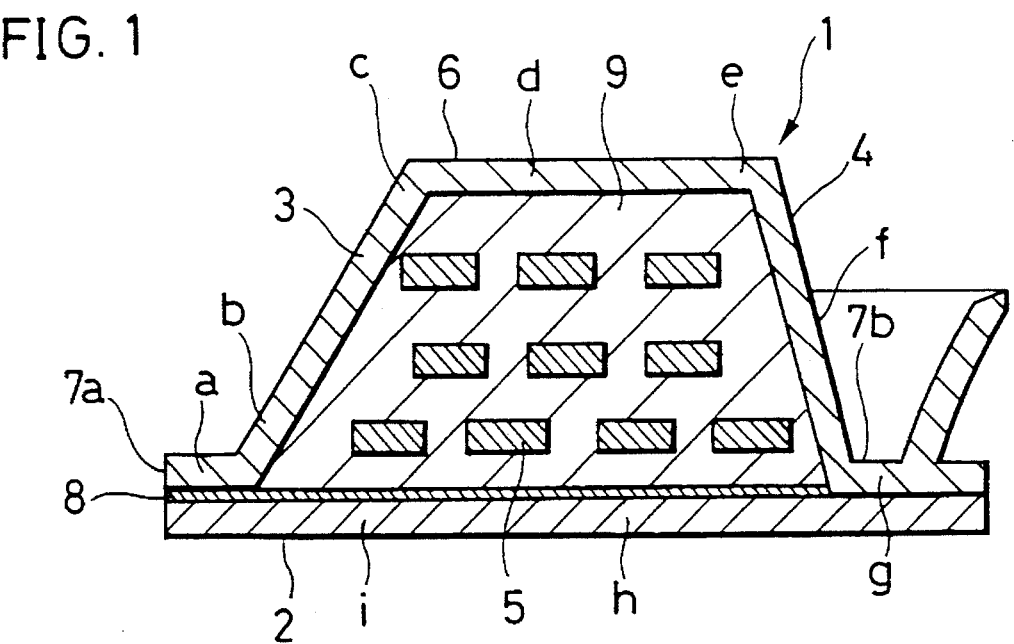
FIG. 1 is a schematic longitudinal cross-sectional view of a thin film magnetic head according to one embodiment of the invention.

Referring to FIG. 1, there is illustrated in elevational cross section a thin film magnetic head generally designated at 1. The head 1 is illustrated as comprising a magnetic pole 4 including a flat lower magnetic pole 2 of a soft magnetic thin film magnetic substance and a convex shaped upper magnetic pole 3 of a soft magnetic thin film magnetic substance which are disposed so as to sandwich coil layers 5 consisting of a plurality of conductors. The upper magnetic pole 3 includes a yoke portion 6 covering the coil layers 5, a pole portion 7a defining a gap portion 8 with the lower magnetic pole 2, and a contact hole portion 7b joined to the lower magnetic pole 2. The coil layers 5 are embedded in an organic insulating layer 9 for insulating the coil layers 5. The organic insulating layer 9 has a raised or convex shape, for example, a trapezoidal shape in the illustrated embodiment.

The soft magnetic thin film-forming magnetic substance used in this type of thin film magnetic device, that is, thin film magnetic head is generally selected from alloys containing a magnetic metal such as Co, Ni, and Fe as a major component and having uniaxial magnetic anisotropy, especially including a composition range having a magnetostriction value of zero. For example, it is known that for Permalloy or an NiFe alloy, approximately Ni-20 wt % Fe is a neutral composition having zero magnetostriction, and for a CoFe alloy, magnetostriction reaches zero at approximately Co-10 wt % Fe. Also useful are compositions of CoNiFe alloy along a zero magnetostriction line.

An alloy has a magnetostriction value which shows a different behavior depending on crystallographic plane orientation, which implies that alloy samples of an identical composition exhibit different magnetostriction if their plane orientation is different. Further samples having an identical major component composition exhibit different magnetostriction depending on their crystal grain size and containment of a trace amount of impurity. Even in such a case, an alloy having composition regions exhibiting zero magnetostriction, positive magnetostriction and negative magnetostriction within a magnetic thin film is acceptable. What is important herein is not a composition, but a magnetostriction value.

A low noise magnetic head device is obtained with magnetic poles of alloy films having positive to negative varying magnetostriction because of anisotropy attributable to the magnetoelastic effect by stresses. In order that the magnetization mechanism of a thin film magnetic head center on magnetization rotation rather than magnetic wall transfer entailing Barkhausen noise, it is important to impart uniaxial anisotropy to a magnetic substance. To this end, one prior art approach attempted to form a thin film in a magnetic field so that the requirement may be met by induction magnetic anisotropy. However, anisotropy is affected by the magnetoelastic effect, and a thin film magnetic head is constructed from a plurality of materials having different physical values, elasticity, internal stress, thermal expansion coefficient, Poisson's ratio and the like. Then the stress distribution is very complex.

Figure 3:
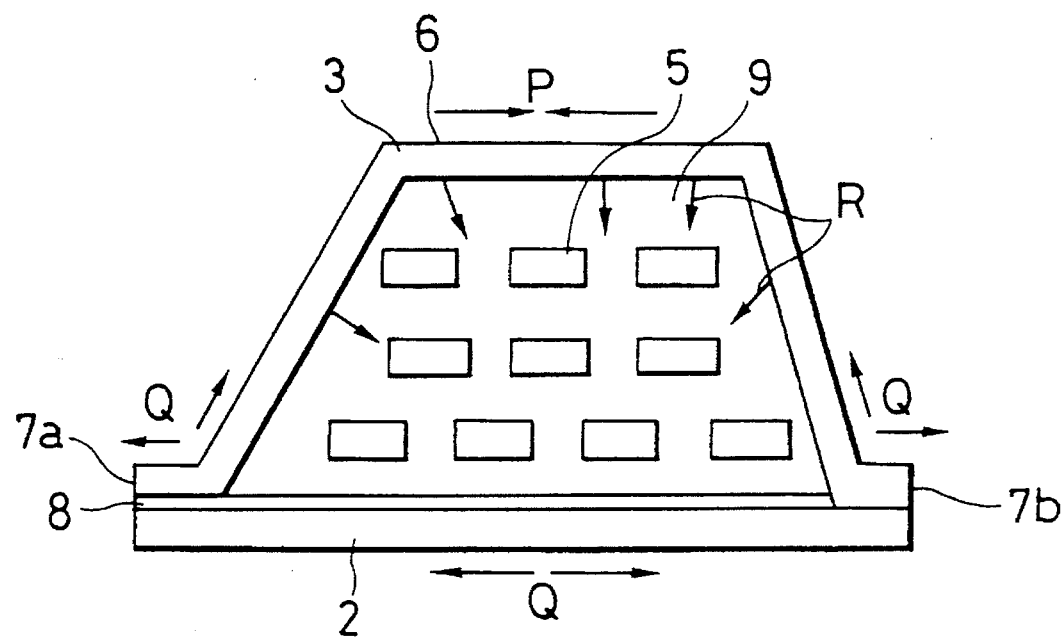
FIG. 3 schematically illustrates the cross-sectional structure of the thin film magnetic head for explaining the directions of deformation of the organic insulating layer and the stresses applied to the magnetic core.

We made three-dimensional analysis of stresses to find that a phenomenon as shown in FIG. 3 appeared after annealing. After the upper magnetic pole 3 is deposited thereon, the organic resin layer or insulating layer 9 is susceptible to deformation and contraction or thermal stresses so that a compressive stress P is exerted in a magnetic path direction on the upper magnetic pole alloy layer in the convex or raised region which is opposed to the lower magnetic pole 2 via the coil layer 5 and the organic insulating layer 9. At the same time, tensile stresses Q in a magnetic path direction act on the lower magnetic pole 2 and those portions of the upper magnetic pole alloy which are disposed contiguous and adjacent to the lower magnetic pole 2. As a result, deforming forces act on the organic insulating layer 9 as shown by arrows R because the lower magnetic pole 2 is fixedly joined to a substrate (not shown) directly or indirectly, and the upper and lower magnetic poles 3 and 2 are fixedly joined to each other at the gap 8 and the contact hole portion 7b with the convex or raised configuration of coil layer 5 and organic insulating layer 9 interposed therebetween.

When the yoke portion 6 of the upper magnetic pole 3 is subject to a compressive stress in a magnetic path direction, anisotropy is induced in an in-plane direction perpendicular to the magnetic path direction if magnetostriction is positive. In contrast, when the lower magnetic pole 2 and the pole portion 7a land contact hole portion 7b of the upper magnetic pole 3 are subject to a tensile stress in a magnetic path direction, anisotropy is induced in an in-plane direction perpendicular to the magnetic path direction if magnetostriction is negative.

As opposed to the prior art anisotropy control resulting from induction magnetic anisotropy by application of a magnetic field during thin film formation, the present invention intends to impart anisotropy in a desired direction by designing such that the upper magnetic pole alloy layer in the convex region which is opposed to the lower magnetic pole through the intervening coil layer and organic insulating layer has positive magnetostriction, thereby allowing the magnetoelastic effect positively utilizing a compressive stress to exert anisotropy.

Figure 2:
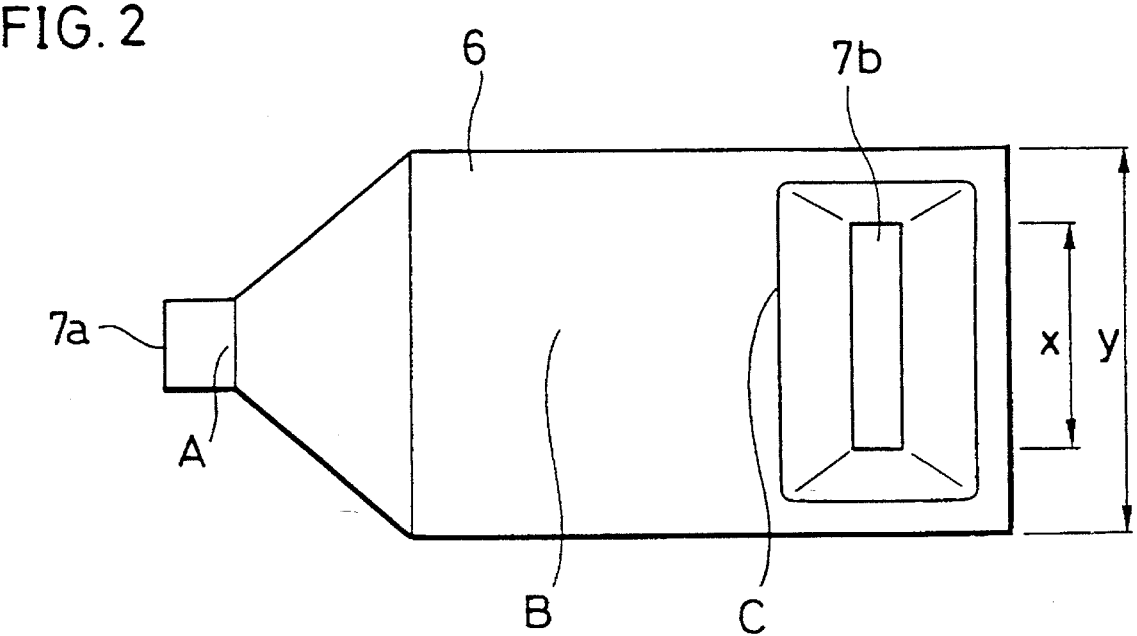
FIG. 2 is a top view of the head of FIG. 1.

FIG. 2 is a top plan view of the thin film magnetic head 1 of the invention wherein the upper magnetic pole 3 is viewed from above. It is important that the pole and contact hole portions of the upper magnetic pole 3 designated at A and C have negative magnetostriction while the yoke portion of the upper magnetic pole 3 designated at B have positive magneto-striction. That is, tensile stresses act on portions A and C in a magnetic path direction and a compressive stress acts on portion B in a magnetic path direction.

The thin film magnetic head is manufactured by the following process. The film forming method which can be used herein is any of sputtering, vacuum evaporation and plating methods, with an electroplating method being preferred. When an alloy film is formed by electroplating, the alloy composition alters with current density and diffusion rate due to a difference in precipitating potential between metal ions. By utilizing this feature, a composition distribution can be established within the upper magnetic pole 3 of the raised configuration. A magnetic thin film having a desired magnetostriction distribution can be deposited by suitably controlling the metal composition ratio, metal salt concentration, and conductive salt concentration of a plating solution, current density, and agitation speed. If the magnetostriction distribution is correlated to the composition distribution, it is effective to increase the bath voltage during film deposition in order to provide a more definite composition distribution.

In the case of NiFe alloy or Permalloy, for example, high current density zones or slow diffusion rate zones have an increased Fe content due to an alloy deposition mechanism known as anomalous co-deposition. A region which is Fe richer than the composition of zero magnetostriction exhibits its positive magnetostriction whereas a region which is Fe poorer than the zero magnetostriction composition exhibits negative magnetostriction. Then by appropriately selecting film depositing conditions, it is possible to deposit the upper magnetic pole such that the top portion thereof which is remote from the lower magnetic pole through the raised configuration is of a positive magnetostriction composition alloy and those portions thereof which are contiguous and adjacent to the lower magnetic pole is of a negative magnetostriction composition alloy.

More particularly, according to the invention, an alloy layer includes a portion which is raised or convex shaped due to the presence of an organic insulating layer, typically a resist layer and which has a different composition from the remaining or lower portions. A thin film is deposited by positively utilizing this difference in height. For example, since electric current collects on the convex or raised portion to provide an increased current density, control is made such that an alloy composition associated with a high current density may have positive magnetostriction. As mentioned above, in the case of Permalloy, the composition may be tailored so as to have a higher Fe content in order to provide for positive magnetostriction. As shown in JP-A 180994/1989, when the plating of Permalloy is analyzed by plotting the current density on the abscissa and the iron content on the ordinate, the resulting curve is convex, which indicates that there is a peak at which the iron content becomes maximum. That is, in a low current density region, the iron content increases as the current density increases. Inversely, in a high current density region, the iron content decreases as the current density increases. Then in the practice of the present invention, the desired magnetostriction distribution is achieved by depositing a film in a low current density region.

In depositing a film by electroplating, the preferred current density ranges from 0.01 to 20 A/dm$^2$, especially 0.5 to 5 A/dm$^2$ when direct current is conducted. Deposition would be slow for commercial application at a lower current density whereas a higher current density would make it difficult to obtain a desired composition and facilitates bath decomposition. Where pulse current flow is used as will be described later, a current density of 0.01 to 20 A/dm$^2$ is preferred.

It is also possible to form the upper magnetic pole in two or more divided segments, obtaining a structure in which in-plane uniform layer segments of different compositions are stacked in a straddling manner. In this embodiment, the segments which are disposed contiguous and adjacent to the lower magnetic pole, especially the pole-adjacent segment are of a negative magnetostriction composition alloy and a yoke segment in the convex region which is disposed remote from the lower magnetic pole is of a positive magnetostriction composition alloy. These two segments are successively deposited as if a crown fitted over a rim.

Further, the purpose is achievable by providing a magnetic pole of a two or more layer structure. In forming the upper magnetic pole layer, a negative magnetostriction composition alloy is formed over the entire magnetic pole extent as a first layer and a positive magnetostriction composition alloy is deposited on the portion of the first layer exclusive of the pole-adjacent portion, thereby achieving the same functional effect. In conventional heads, two stage plating is employed to separately deposit pole and yoke portions of the magnetic pole. In JP-B 8004/1991, for example, a yoke portion of a smaller area is first deposited and a pole/yoke portion of a larger area is then deposited. This is done simply for the purpose of preventing local saturation of magnetic flux. It is unknown in the prior art to form the upper magnetic pole by depositing a pole/yoke portion from a negative magnetostriction composition and a yoke portion from a positive magnetostriction composition as in the present invention.

In order that the thin film magnetic head have a compressive stress act in a magnetic path direction, with respect to the configuration of the magnetic core, the ratio of the width x of the contact hole portion 7b to a dimension of the upper magnetic pole perpendicular to the magnetic path direction, that is, the width y of the yoke portion 6, x/y, is important. Desirably, x is equal to or smaller than y. Most desirably, the relationship: 2x >y, especially 2x >y ≧ x x should be met. Outside the range, the compressive stress acts intensely in directions perpendicular and oblique to the magnetic path, making it difficult to impart anisotropy in a magnetic path direction. Where the yoke width is irregular, the maximum yoke width is y. The contact hole width x is the maximum width of the upper magnetic pole in direct joint to the lower magnetic pole without the intervening organic resin insulating layer. It is to be noted that y is approximately 20 to 100 μm.

Figure 6:
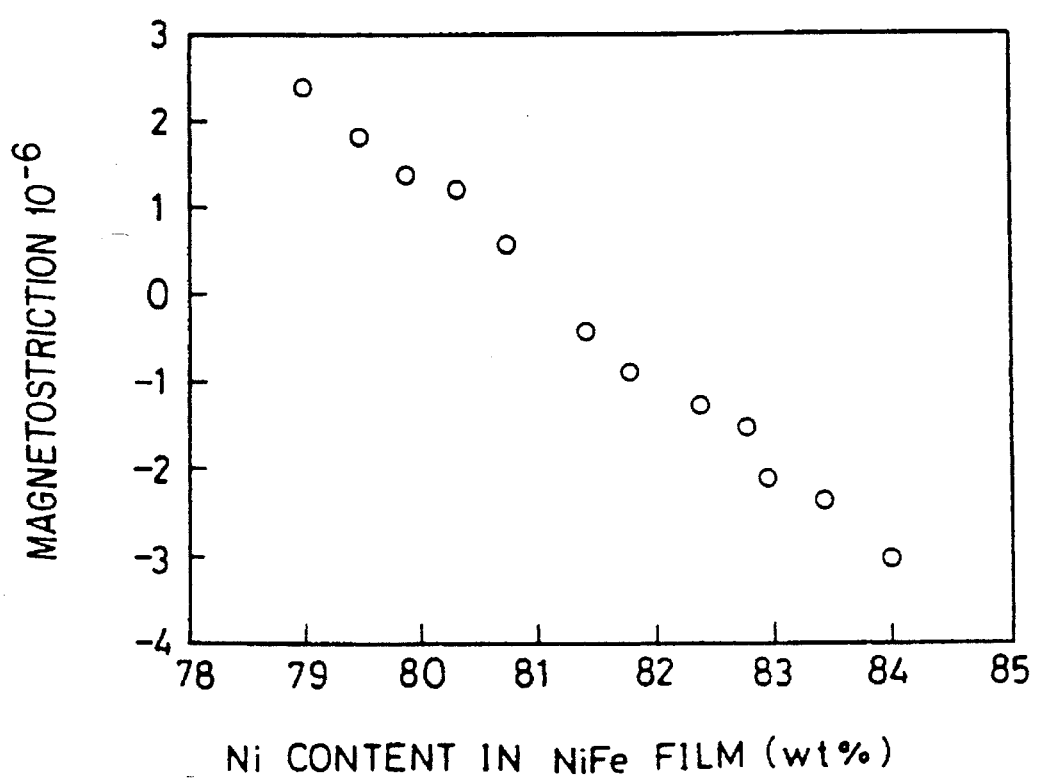
FIG. 6 is a diagram showing the magnetostriction of a NiFe soft magnetic thin film as a function of a nickel content.

FIG. 6 shows the magnetostriction of NiFe alloy as a function of alloy composition. It is seen from FIG. 6 that the magnetostriction reaches zero at a Ni content of 81.18% by weight. Positive magnetostriction is available at lower Ni contents whereas negative magnetostriction is available at higher Ni contents. However, since magnetostriction is greatly altered by containment of a trace ingredient, the composition should be determined depending on the properties of a film actually used in the device. The magnitude or absolute value of magnetostriction should preferably be up to $1\times10^{-5}$, more preferably up to $0.5\times10^{-5}$. If the magnitude of magnetostriction exceeds this range, the anisotropy based on the magnetoelastic effect would become too intense, resulting in a loss of effective magnetic permeability. As previously mentioned, the magnitude of anisotropy associated with the magnetoelastic effect is equal to a stress multiplied by a magnetostriction. When the compressive stress from the organic insulating layer is greater, the magnetic layer receiving that stress should have low magnetostriction because otherwise the effective magnetic permeability would be low. In general, it is desired to control the compressive stress from the organic insulating layer to fall in the range of several tens of MPa to about 1,000 MPa. To impart appropriate induction magnetic anisotropy, the film should preferably have a magnetostriction value of at least about $1\times10^{-8}$. It is also desirable that the stress acts in a magnetic path direction. If the stress contains a component acting perpendicular to the magnetic path, the effective stress which is the difference between parallel and perpendicular components with respect to the magnetic path direction should meet the stress requirement defined herein.

Figure 4:
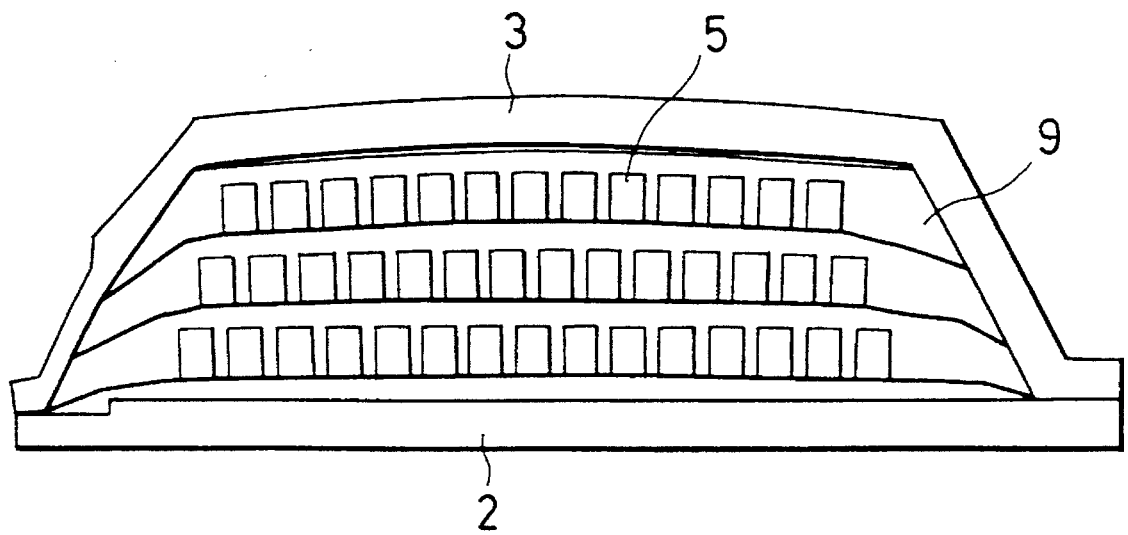
FIG. 4 is a simulation showing a shape change during annealing.
Figure 5:
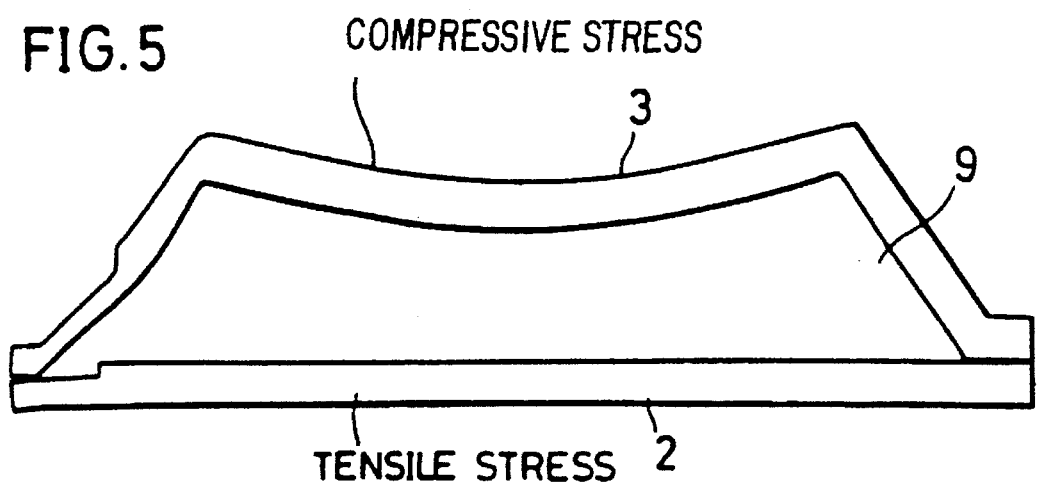
FIG. 5 is a simulation showing a shape change and stress distribution after annealing.

The organic insulating layer should have a satisfactory insulating resistance, be able to be patterned, and to impart effective stresses to the upper magnetic pole which is deposited so as to cover the convex resin portion. It may be made of various resins, preferably various photoresists, for example, cyclic polyisoprene, polyimide, polyimide isoindroquinazolin-dione, and novolak resists, especially novolak photoresists. Although the mechanism that the organic insulating layer applies compressive stresses to the upper magnetic pole is not well understood, it is believed that plastic deformation of the magnetic thin film occurs at the annealing temperature to induce thermal stresses between the resist layer and the magnetic thin film to generate a stress distribution. Simulation results are shown in FIGS. 4 and 5. The resist layer has a very high coefficient of thermal expansion as compared with metals (or magnetic alloys) and ceramics. For example, novolak system resins have a coefficient of thermal expansion of 300 to $500\times10^{-7}/°$ C. whereas Permalloy films have a coefficient of thermal expansion of $128\times10^{-7}/°$ C. When a Permalloy film is formed on a novolak resin having a softening point of 205° C. and annealed at 250° C., then the resist is apparently bulged. This results in the simulation of FIG. 4 wherein the upper magnetic pole 3 or magnetic thin film is deformed and lifted upward during annealing. When the temperature is lowered back to room temperature (25° C.), the organic insulating layer 9 of resist contracts significantly so that intense compressive stresses are generated at the top while tensile stresses are generated at the bottom due to the presence of the underlying thick substrate as shown in FIG. 5. These figures are depicted in an exaggerated manner by magnifying the magnitude of deformation by a factor of 50. Though not drawn in the figures, the underlying substrate and an alumina film as a protective film are also taken into account in the simulation. It will be understood that the upper magnetic pole shown in FIGS. 4 and 5 is of a two layer structure as mentioned above.

Other factors to be considered include contraction of the resist layer due to evaporation of high-boiling components among solvents contained in the resist layer, contraction of the resist layer due to decomposition reaction of the resist component itself, contraction of the resist layer through polycondensation by dehydration reaction, and generation of thermal stresses during cooling step after heating above the softening point. As mentioned above, the resist layer has a very high coefficient of thermal expansion than metals and ceramics. Due to this differential thermal expansion, if a Permalloy film is deposited on a novolak resin having a softening point of 205° C., annealed at 250° C., and then cooled down to room temperature, thermal stresses generate which correspond to a temperature difference of 180° C. or more. In either mechanism, any resist can be used as the organic insulating layer as long as a dried resist applies compressive stresses to the Permalloy film. It is also important that the corners of the convex or trapezoidal shape be rounded in order that stresses are developed in a desired direction. To this end, the resist may be heat treated at a relatively low temperature to cause the resist pattern to sag prior to deposition of the upper magnetic thin film.

For imparting effective stresses to the upper magnetic pole, it is advantageous to anneal the upper magnetic pole at the end of its deposition. The annealing temperature and time may be suitably chosen so as to provide a desired state of stress. Preferred annealing conditions include a temperature of at least 200° C., more preferably at least 250° C., most preferably 250° to 350° C. and a time of at least ½ hour, typically ½ to 3 hours. If desired, forced annealing treatment may be omitted. Since the thin film coil receives current flow at a ultra-high current density per unit cross-sectional area so that a substantial amount of heat generates, an equivalent effect to annealing is expected from warming-up prior to actual use.

In such an embodiment, useful results are obtained when the organic insulating layer 9 has a thickness of about 0.5 to 500 μm and the magnetic thin film has a thickness of about 0.01 to 10 μm. The substrate not shown in the figures may be made of various ceramics such as a $Al_2O_3$—TiC system. The lower magnetic pole 2 may be formed on the substrate directly or through any of various undercoat layers or underlying structures.

In the practice of the invention, the upper magnetic layer can be separated from the underlying resist layer due to increased compressive stresses. If separation occurs, compressive stress is no longer applied from the resist layer to the upper magnetic pole. That is, only tensile stress acts on the upper magnetic pole. Such inconvenience can be avoided by increasing the interlayer bond strength. Any of conventional surface modification methods known to be effective for improving thin film bond strength, for example, ultraviolet irradiation, oxygen ashing and plasma polymerization is effective for the purpose. It is also effective to form a thin film of chromium or titanium as an undercoat film for improving the bond of the magnetic layer.

The magnetic domain structure of the upper and lower magnetic poles may be observed in an actual head state at 5 MHz using a scanning Kerr effect microscope manufactured by Phase Metrics Co. The observation results show that the magnetic path direction is an axis of difficult magnetization. A similar pattern is observed prior to annealing, but the number of 180 degree magnetic walls is somewhat less than that after annealing, indicating less anisotropy. The anisotropy in the magnetic path direction accomplished as induction magnetic anisotropy resulting from film formation in a magnetic field or magnetoelastic anisotropy exerted by the weak tensile stress immediately after film formation does not provide a sufficient intensity of anisotropy. Desired intense magnetic anisotropy is established only by the magnetoelastic anisotropy exerted by the strong compressive stress resulting from annealing.

Figure 7:
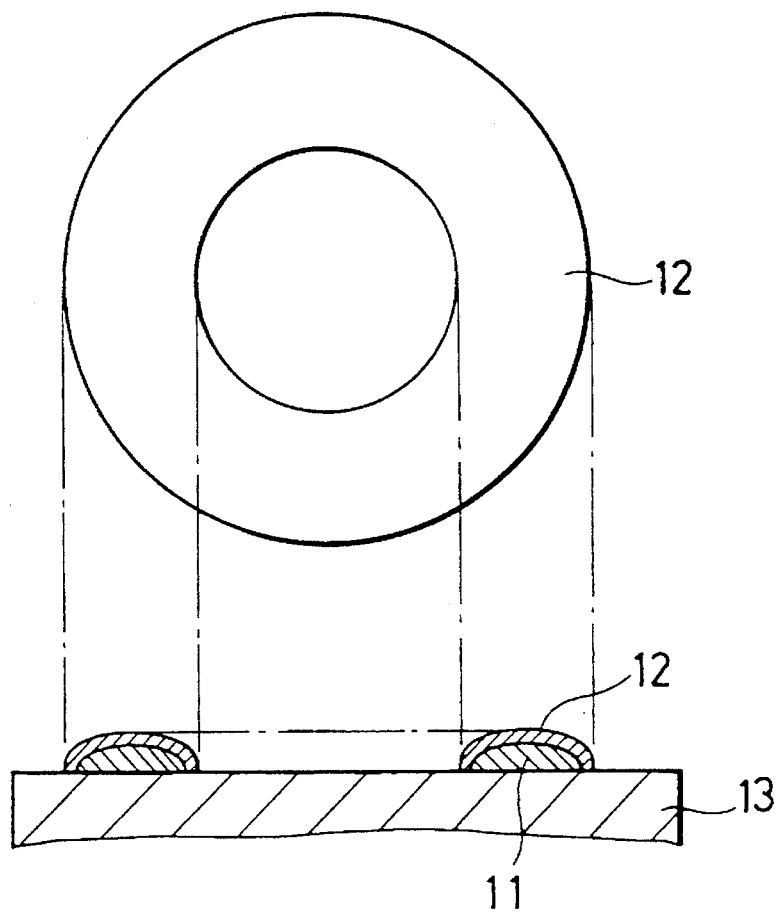
FIG. 7 schematically illustrates in plan view and cross section the structure of a thin film magnetic transformer.
Figure 8:
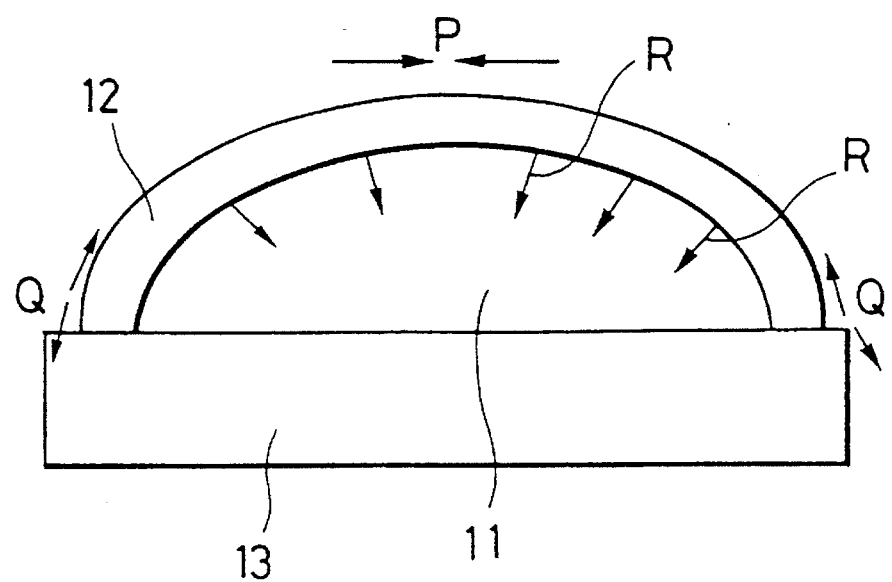
FIG. 8 schematically illustrates the cross-sectional structure of the transformer for explaining the directions of the stresses exerted therein.

Similarly in other thin film magnetic devices such as thin film transformers, an axis of difficult magnetization is imparted in a desired magnetic path direction due to the magnetoelastic effect by selecting the shape of an organic insulating layer, the shape of a magnetic core, annealing conditions and the like. For example, FIG. 7 illustrates a ring shaped core 12 wherein anisotropy having an axis of difficult magnetization in a magnetic path direction can be imparted by forming an annular organic resin layer 11 having a raised or convex cross-sectional shape on a substrate 13, and forming a magnetic layer 12 on the resin layer 11. Note that a coil is omitted from the figure. In this embodiment, the lower magnetic pole is absent, an upper magnetic pole is formed on a convex (semi-ellipsoidal in the figure) organic insulating layer with opposed edges of the upper magnetic pole being joined to the underlying substrate 13 directly (not through the intervening organic insulating layer). Then stresses act in this structure as shown in FIG. 8 wherein P represents a compressive stress, Q represents a tensile stress, and R represents a direction of deformation of the organic insulating layer. In this embodiment, a compressive stress also acts in a circumferential direction, that is, in a direction perpendicular to the plane of drawing paper, but its magnitude is small enough to be negligible. This is equivalent to a thin film magnetic head configuration wherein the yoke width is equal to the contact hole width. Since a compressive stress acts perpendicular to the magnetic path, the portion where a compressive stress acts is made as a magnetic layer formed of a negative magnetostriction composition, thereby imparting anisotropy having an axis of difficult magnetization in a circumferential direction. Since a tensile stress acts in lower portions, the lower portions are formed to have a positive magnetostriction composition, thereby enhancing anisotropy having an axis of difficult magnetization in a circumferential direction. The annular core is improved in effective magnetic permeability and hence, inductance property. This is also applicable to a rectangular magnetic core. In this embodiment, the organic insulating layer 11 has a thickness of 0.5 to 50μm and the magnetic layer 12 has a thickness of 0.01 to 10μm. The substrate 13 is of various materials such as alumina and alumina glass.

EXAMPLE

Examples of the present invention are given below by way of illustration and not by way of limitation.

Example 1

A thin film magnetic head of the structure shown in FIGS. 1 and 2 was fabricated. On a $Al_2O_3$—TiC substrate having a diameter of 3 inch and a thickness of 2 mm, an undercoat alumina film was formed by sputtering. A Permalloy film of 1,000Å thick was formed on the alumina film by sputtering, the Permalloy film serving as a electroplating-receptive conductive undercoat layer. A lower magnetic pole resist mask was patterned thereon. Thereafter, Permalloy was electrodeposited to form a lower magnetic pole film under the following conditions and at a current density of 1 A/dm².

Electroplating bath

| | |
|---|---|
| $NiSO_4.6H_2O$ | 150 g/l |
| $FeSO_4.7H_2O$ | 5–20 g/l |
| $H_3BO_3$ | 20 g/l |
| $NH_4Cl$ | 10 g/l |
| Saccharin | 1 g/l |
| Surfactant | 0.05 g/l |
| pH | 2.5 |
| Temperature | 20° C. |

After the lower magnetic pole film was patterned, an alumina gap layer was formed. An insulating layer of novolak photoresist and a coil layer of plated copper film were alternately formed, three strata for each. Each of the insulating strata was annealed at 230° C. for one hour on every application. The insulating film at the end of annealing had a total thickness of 20 μm. The novolak photoresist was additionally applied to form an insulating film of 2 μm thick. A Permalloy film of 1,000 Å thick was formed on the insulating film by sputtering, the Permalloy film serving as an electroplating-receptive conductive undercoat layer. An upper magnetic pole resist mask was patterned thereon. Thereafter, Permalloy was electrodeposited to form an upper magnetic pole film under the same conditions as used in the deposition of the lower magnetic pole film except that the current density was changed from 1 A/dm² to 8 A/dm² in order to form a film having a formation distribution, that is, a magnetostriction distribution. The upper magnetic pole pattern included a contact hole having a width x of 50 μm and a yoke portion having a width y of 60 μm. As to the magnitude of magnetostriction, the desired composition was obtained by increasing or decreasing the amount of iron ion in the plating bath.

After formation of the upper magnetic pole film, it was patterned and annealed at 250° C. for one hour. Thereafter, an alumina protective film of 20 μm thick was formed by sputtering. The resulting structure was diced, machined and combined with other head members (not shown) to complete a thin film magnetic head assembly.

In this way, thin film magnetic head sample Nos. 1 to 8 were prepared while varying the NiFe electroplating conditions. These samples were measured for composition distribution in the cross sections taken at points (a) to (i) in FIGS. 1 and 2. The results are shown in Table 1 wherein the content of Ni is expressed in % by weight. Sample Nos. 1 to 5 are within the scope of the invention while sample Nos. 6 to 8 are outside the scope of the invention. The composition distribution was measured by picking up a thin film magnetic head of the same configuration from an identical Position in each wafer, sectioning the head at the selected points, and analyzing by means of an X-ray microanalyzer.

TABLE 1

| Sample No. | Ni content, % by weight Point | | | | | | | | |
|---|---|---|---|---|---|---|---|---|---|
| | a | b | c | d | e | f | g | h | i |
| 1 | 81.49 | 81.24 | 80.80 | 80.81 | 80.87 | 81.43 | 81.34 | 81.50 | 81.49 |
| 2 | 81.28 | 81.21 | 81.11 | 81.12 | 81.12 | 81.21 | 81.29 | 81.27 | 81.18 |
| 3 | 81.78 | 81.49 | 80.90 | 80.68 | 80.74 | 81.46 | 81.76 | 81.66 | 81.66 |
| 4 | 81.55 | 81.31 | 80.29 | 80.44 | 80.38 | 80.29 | 81.28 | 81.54 | 81.50 |
| 5 | 82.51 | 81.64 | 79.27 | 79.32 | 79.20 | 79.60 | 81.76 | 82.03 | 82.52 |
| 6 comparison | 81.49 | 81.45 | 81.50 | 81.54 | 81.49 | 81.46 | 81.46 | 81.47 | 81.53 |
| 7 comparison | 82.52 | 82.81 | 82.82 | 82.82 | 82.60 | 82.54 | 82.42 | 82.51 | 82.51 |
| 8 comparison | 80.20 | 80.76 | 80.96 | 80.90 | 80.02 | 80.10 | 80.09 | 80.97 | 80.37 |

Table 2 shows the magnetostriction values at the measurement points (a) to (i). The magnetostriction value is estimated on the basis of a measurement made on a thin film of the same composition and plane orientation by an optical lever method.

TABLE 2

| Sample No. | Magnetostriction ($\times 10^{-6}$) Point | | | | | | | | |
|---|---|---|---|---|---|---|---|---|---|
| | a | b | c | d | e | f | g | h | i |
| 1 | 0.25 | −0.03 | 0.34 | 0.33 | 0.28 | −0.12 | −0.20 | −0.26 | −0.25 |
| 2 | −0.07 | −0.01 | 0.08 | 0.07 | 0.07 | −0.01 | −0.08 | −0.06 | −0.07 |
| 3 | −0.50 | −0.25 | 0.25 | 0.49 | 0.39 | −0.22 | −0.48 | −0.39 | −0.39 |
| 4 | −0.30 | −0.09 | 0.78 | 0.65 | 0.70 | 0.78 | −0.07 | −0.29 | −0.31 |
| 5 | −1.10 | −0.37 | 1.63 | 1.58 | 1.69 | 1.35 | −0.47 | −0.70 | −1.11 |
| 6 comparison | −0.20 | −0.21 | −0.26 | −0.29 | −0.25 | −0.22 | −0.22 | −0.23 | −0.28 |
| 7 comparison | −1.11 | −1.35 | −1.36 | −1.36 | −1.18 | −1.13 | −1.02 | −1.10 | −1.10 |
| 8 comparison | 0.84 | 0.37 | 0.20 | 0.25 | 1.00 | 0.93 | 0.94 | 0.20 | 0.70 |

Table 3 shows the measurements of wiggle noise. Sample Nos. 1 to 5 within the scope of the invention have substantially low wiggle values as compared with sample Nos. 6 to 8 outside the scope of the invention. The wiggle was measured by using a 3.5 inch magnetic disk of the sputtering type and repeatedly writing and reading signals at a frequency of 7 MHz, with a variation of read output being expressed in % as a wiggle value.

TABLE 3

| Sample No. | Wiggle, % |
|---|---|
| 1 | 0.6 |
| 2 | 0.8 |
| 3 | 0.3 |
| 4 | 0.6 |
| 5 | 0.8 |
| 6* | 5.8 |
| 7* | 3.4 |
| 8* | 4.2 |

*comparison

Figure 9:
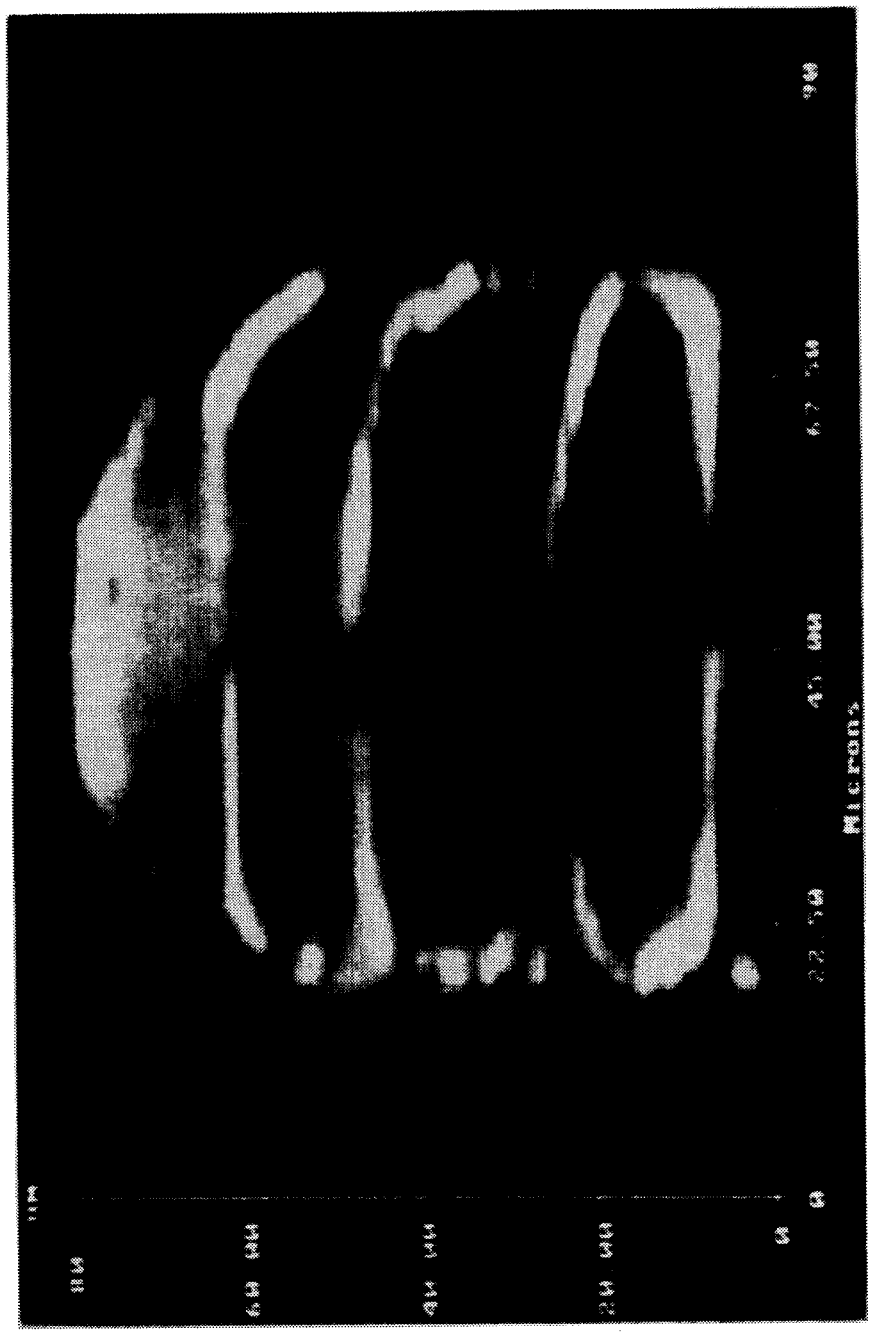
FIG. 9 is a photomicrograph of an inventive thin film magnetic head showing a magnetic domain structure.
Figure 10:
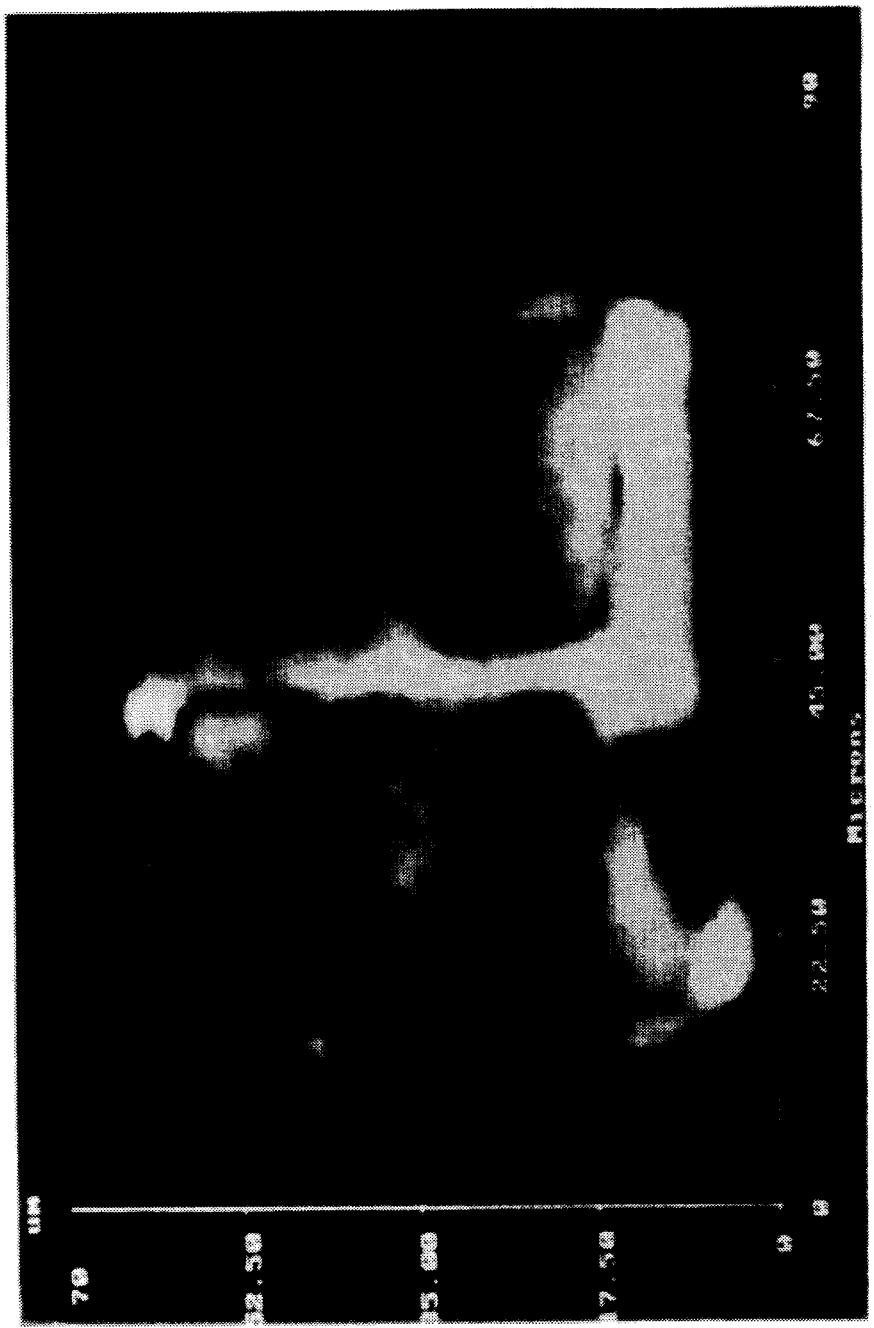
FIG. 10 is a photomicrograph of a comparative thin film magnetic head showing a magnetic domain structure.

Additionally, the magnetic domain structure was observed in an actual head state at 5 MHz using a scanning Kerr effect microscope manufactured by Phase Metrics Co. The results are shown in FIGS. 9 and 10 wherein the ordinate corresponds to the magnetic path direction. FIG. 9 is the photomicrograph of sample No. 1 wherein an axis of difficult magnetization lies in the magnetic path direction. Sample Nos. 2 to 5 had the same pattern as No. 1. FIG. 10 is the photomicrograph of sample No. 6. Sample Nos. 7 and 8 had the same pattern as No. 6. A similar pattern to FIG. 9 is observed prior to annealing, but the number of 180 degree magnetic walls is less by one than the number of sample No. 1 (as annealed), indicating slightly weaker anisotropy. In sample No. 6, a magnetic domain was observed in an ordinate direction in a region adjacent to the pole portion as seen from FIG. 10. This is probably because prior to annealing, a weak tensile stress acts in a magnetic path direction.

Separately there were fabricated thin film magnetic heads wherein the upper magnetic pole had a contact hole width x of 50 μm and a yoke width y of 100 μm (2x=y) and a composition which varied to provide a magnetostriction distribution. Even those samples wherein the lower magnetic pole and the portion of the upper magnetic pole which is disposed contiguous and adjacent to the lower magnetic pole are of a negative magnetostriction alloy, the yoke portion of the upper magnetic pole which is spaced from the lower magnetic pole via the intervening coil layer and organic insulating layer is of a positive magnetostriction alloy, and an intermediate portion of the upper magnetic pole is of a zero magnetostriction alloy had a lower wiggle value than the foregoing samples within the scope of the invention.

Example 2

The procedure of Example 1 was repeated except that formation of the magnetic pole film was formed in two portions, a pole/yoke portion and a yoke portion. More particularly, the lower magnetic pole was formed such that the pole/yoke portion was 3 μm thick and the yoke portion was 2 μm thick and both had a uniform composition of 82.0 wt % Ni and 18.0 wt % Fe. The upper magnetic pole was formed such that the pole/yoke portion was 2 μm thick and had a uniform composition of 82.0 μwt % Ni and 18.0 wt % Fe. In sample No. 9 falling in the scope of the invention, the yoke portion of the upper magnetic pole was 2 μm thick and had a uniform composition of 78wt % Ni and 22 wt % Fe. In sample No. 10 outside the scope of the invention, the yoke portion of the upper magnetic pole was 2 μm thick and had a uniform composition of 82 wt % Ni and 18 wt % Fe.

Sample Nos. 9 and 10 had a wiggle value of 0.8 wt % and 2.8 wt %, respectively. All the magnetic poles of sample No. 10 and the entire lower magnetic pole and the pole portion of the upper magnetic pole of sample No. 9 had a composition of negative magnetostriction. The yoke portion of the upper magnetic pole of sample No. 9 had a multi-layer structure including a lower film of negative magnetostriction and an upper film of positive magnetostriction, but the film structure as a whole behaved like a film of positive magnetostriction because the upper film has a greater magnitude of magnetostriction.

Example 3

A transformer having the core of FIG. 7 was fabricated to demonstrate the benefits of the invention. The annular core shape had an inner diameter of 500 μm and an outer diameter of 600 μm. The resist layer was 30 μm thick. In an applied magnetic field, a Permalloy film of 1.0 μm thick was deposited on the resist layer. Primary and secondary coils having a width of 15 μm and a thickness of 3 μm were provided both 40 turns. The formation of the Permalloy film in a magnetic field was followed by annealing in vacuum at 280° C. for 1 hour for imparting anisotropy. A transformer sample wherein the top region had a magnetostriction of $-0.9 \times 10^{-6}$ and the bottom region had a magnetostriction of $+1.5 \times 10^{-6}$ had an inductance L of 80 nH. A (comparative) transformer sample including a uniform composition film having a magnetostriction of $-0.3 \times 10^{-6}$ had an inductance L of 30 nH. Inductance was measured by a network analyzer HP 4195A manufactured by Hewlett Packard.

BENEFITS OF THE INVENTION

The thin film magnetic device of the invention has the advantage that since magnetostriction is zero in an intermediate region of the raised or convex shape between the top and bottom regions, anisotropy is imparted in a desired direction by utilizing the anisotropy resulting from the magnetoelastic effect which takes full advantage of a compressive stress. The thin film magnetic device of the invention is designed such that a compressive stress is exerted in a positive magnetostriction region and a tensile stress is exerted in a negative magnetostriction region or vice versa, thereby imparting anisotropy in a desired direction.

Where the magnetostriction has a magnitude of up to $1 \times 10^{-5}$, that is, within $\pm 1 \times 10^{-5}$, the device experiences minimal influence of magnetostriction during operation and is optimized in anisotropy, resulting in improved operating efficiency and noise suppression.

Also where the soft magnetic alloy thin film is deposited by electroplating, the manufacturing cost is low and the devices exhibit consistent magnetic properties.

Preferably a thin film magnetic head includes upper and lower magnetic poles sandwiching a resist layer having a coil layer embedded therein wherein the lower magnetic pole and the region of the upper magnetic pole which is disposed adjacent to the lower magnetic pole are formed of a negative magnetostriction alloy composition, the region of the upper magnetic pole which is separated from the lower magnetic pole through the coil layer is formed of a positive magnetostriction alloy composition, and an intermediate region of the upper magnetic pole is formed of a zero magnetostriction alloy composition. Then during reading operation of the thin film magnetic head, the alloy composition of the magnetic pole has approximately zero magnetostriction as a whole with respect to the magnetization upon reading, ensuring reduced noise on reading.

Another preferred thin film magnetic head includes an upper magnetic pole and a lower magnetic pole having yoke portions sandwiching a coil layer, pole portions and contact hole portions which are disposed closely or joined together, wherein the yoke portion of the upper magnetic pole is of a positive magnetostriction composition, the pole and contact hole portions of the upper magnetic pole are of a negative magnetostriction composition. Then during reading operation, the yoke and pole portions as a whole have approximately zero magnetostriction with respect to the magnetization upon reading, ensuring further reduced noise on reading.

In the preferred embodiment, the upper magnetic pole includes at least one layer of negative magnetostriction composition film and at least one layer of positive magnetostriction composition film, and the pole portion of the upper magnetic pole is constructed solely of a negative magnetostriction composition film. Then during reading operation of the thin film magnetic head, the pole portion has an appropriate magnetostriction distribution with respect to the magnetization upon reading, resulting in minimized reading noise. Since the magnetic pole consists of a plurality of layers, the layered film exhibits stable magnetic properties. Also in this embodiment, if the magnetostriction has a magnitude of up to $1 \times 10^{-5}$, the head experiences minimal influence of magnetostriction of the magnetic pole on the magnetic field applied for reading during reading operation of the head and possesses optimum anisotropy, resulting in improved operating efficiency and noise suppression. In the preferred embodiment wherein the soft magnetic alloy thin film is deposited by electroplating, the manufacturing cost is low and the devices exhibit consistent magnetic properties. By properly controlling the contact hole portion width x and yoke portion width y of the upper magnetic pole, anisotropy is imparted in a magnetic path direction.

Japanese Patent Application No. 167776/1993 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A thin film magnetic device, comprising:

an underlying layer;

a layer having a raised shape including an organic insulating layer, said layer having said raised shape provided directly or indirectly on said underlying layer; and a soft magnetic alloy thin film having a first end and a second end, said film covering said layer having said raised shape, said first end being fixedly joined to said underlying layer directly and said second end being fixedly joined to said underlying layer either directly or indirectly;

said soft magnetic alloy thin film consisting of a top region, a bottom region, the top region having a height relative to the underlying layer, the bottom region having a height relative to the underlying layer, and the height of the top region being greater than the height of the bottom region for all points of the top region and the bottom region, and an intermediate region that is between said top region and said bottom region, wherein said film has a magnetostriction distribution varying from positive to negative magnetostriction values such that all of said top region has one of positive and negative magnetostriction, all of said bottom region has the other one of said positive and negative magnetostriction, and at least part of said intermediate region has zero magnetostriction.

2. The thin film magnetic device of claim 1 having a magnetic path, wherein said soft magnetic alloy thin film in the region where magnetostriction is positive is under compressive stress along a direction of the magnetic path in the region where magnetostriction is positive and said soft magnetic alloy thin film in the region where magnetostriction is negative is under tensile stress along a direction of the magnetic path in the region where magnetostriction is negative.

3. A device according to claim 2, wherein the region where magnetostriction is positive is said top region.

4. The thin film magnetic device of claim 1 having a magnetic path, wherein the region where magnetostriction is negative is under compressive stress in a direction perpendicular to a direction of the magnetic path in the region where magnetostriction is negative and the region where magnetostriction is positive is under tensile stress in a direction perpendicular to a direction of the magnetic path in the region where magnetostriction is positive.

5. The thin film magnetic device of claim 4 wherein said layer of said raised shape and said soft magnetic alloy film are configured to a ring shape whereby a closed magnetic path is formed along the ring.

6. A device according to claim 4, wherein the region where magnetostriction is negative is said top region.

7. The thin magnetic device of claim 1 wherein the magnetostriction has a absolute value less than $1\times10^{-5}$.

8. The thin film magnetic device of claim 1 wherein said soft magnetic alloy film is formed by electroplating.

9. The thin film magnetic device of claim 1 which further comprises a support on which said layer of said raised shape is formed, said soft magnetic alloy thin film being in direct contact with the support.

10. The thin film magnetic device of claim 1 wherein said organic insulating layer is made of a resin and annealed after formation of said soft magnetic alloy film thereon.

11. The thin magnetic device of claim 10 wherein the annealing temperature is at least 200° C.

12. A thin film magnetic head, comprising:

an underlying layer forming a lower magnetic pole in the form of a soft magnetic alloy film;

a gap layer above and covering a part of said lower magnetic pole;

an organic insulating layer of a raised shape formed on a part of said gap layer and having a coil layer embedded therein, and an upper magnetic pole in the form of a soft magnetic alloy thin film formed on said lower magnetic pole, said gap layer and said organic insulating layer; wherein the soft magnetic alloy film of said lower magnetic pole has negative magnetostriction;

a bottom region of the soft magnetic alloy film of said upper magnetic pole, which is disposed contiguous and adjacent to said lower magnetic pole, has negative magnetostriction, a top region of the soft magnetic alloy film of said upper magnetic pole has positive magnetostriction, the top region having a height relative to the underlying layer, the bottom region having a height relative to the underlying layer, and the height of the top region being greater than the height of the bottom region for all points to the top region and the bottom region.

13. The thin film magnetic device of claim 12 wherein the magnetostriction has a absolute value less than $1\times10^{-5}$.

14. The thin film magnetic device of claim 12 wherein said soft magnetic alloy thin film is formed by electroplating.

15. The thin film magnetic device of claim 12 wherein a pole face having an extended direction that is parallel to said gap layer is formed from adjacent surfaces of said lower magnetic layer, said gap layer, and said upper magnetic layer, and wherein a contact hole has a width x along said extended direction and yoke portions of said upper magnetic pole have a width y along said extended direction, wherein $2x > y$.

16. The thin film magnetic head according to claim 15, wherein said extending direction is perpendicular to a magnetic path direction of said magnetic head.

17. The thin film magnetic device of claim 12 wherein said organic insulating layer is a resist film.

18. The thin film magnetic device of claim 17 wherein said resist film is annealed after formation of said upper magnetic pole thereon.

19. The thin film magnetic device of claim 18 wherein the annealing temperature is at least 200° C.

20. The thin film magnetic device of claim 12 wherein said upper and lower magnetic poles include yoke portions opposed through said coil layer, pole portions joined together through a gap and disposed close to each other, and contact hole portions joined to each other directly, the yoke portion of said upper magnetic pole is of a positive magnetostriction composition, and the pole portion of said upper magnetic pole and the yoke and pole portions of said lower magnetic pole are of a negative magnetostriction composition.

21. The thin film magnetic device of claim 20, wherein said upper magnetic pole includes at least:

a first layer of soft magnetic alloy thin film with a negative magnetostriction composition and a second layer of soft magnetic alloy thin film with a positive magnetostriction composition;

wherein the first and second layers are adjacent one another; and wherein the pole portions of said upper and lower magnetic poles and the yoke portion of said lower magnetic pole are constructed solely of soft magnetic alloy thin film of a negative magnetostriction composition.

22. The thin magnetic device of claim 12 which further comprises a ceramic substrate, said lower magnetic pole being formed on said ceramic substrate directly or through an undercoat layer.

23. A thin film magnetic device, comprising:

a layer having a raised shape including an organic insulating layer;

a first soft magnetic alloy film covering said raised layer and having a top region and a bottom region;

an underlying layer forming a second soft magnetic alloy film below the layer of the raised shape;

wherein the first soft magnetic alloy film has a magnetostriction distribution varying from positive to negative magnetostriction values such that said first soft magnetic alloy film has positive magnetostriction throughout the top region and negative magnetostriction throughout the bottom region, the top region having a height relative to the underlying layer, the bottom region having a height relative to the underlying layer, and the height of the top region being greater than the height of the bottom region for all points of the top region and the bottom region.

24. A device according to claim 23, wherein the second film comprises all of the soft magnetic alloy thin film that is below the layer of the raised shape.

25. A thin film transformer core, comprising:

an annular layer have an annular shape, an annular lower side, and an annular upper side above the annular lower side, said annular upper side having a cross section along a radial direction of said annular shape that is raised and has a surface with an upper portion and a lower portion such that the upper portion is above the lower portion;

an annular soft magnetic alloy film on said upper side and having an annular top region adjacent said upper portion and an annular bottom region adjacent said lower portion, such that all points of the annular top region have a higher elevation then all points of the annular bottom region relative to the annular lower side;

wherein said annular top region has negative magnetostriction and said annular bottom region has positive magnetostriction.

26. A thin film transformer core, comprising:

a soft magnetic alloy film forming a closed loop and having a closed magnetic path around said closed loop, said film having an upper side and a lower side, the upper side opposing the lower side, said upper side having a top region extending along the magnetic path direction and a bottom region extending along the magnetic path direction, the top region at any point along the magnetic path having a higher elevation than the bottom region at that point along the magnetic path relative to the lower side;

wherein said top region has negative magnetostriction and said bottom region has positive magnetostriction.

* * * * *

UNITED STATES PATENT AND TRADEMARK OFFICE
CERTIFICATE OF CORRECTION

PATENT NO.  : 5,570,251
DATED       : October 29, 1996
INVENTOR(S) : OSAMU SHINOURA, TSUTOMU KOYANAGI, HIROSHI CHIHARA,
              MAKOTO YOSHIDA, TSUTOMU CHOU It is certified that error appears in the above-indentified patent and that said Letters Patent is hereby corrected as shown below:

In Claim 7:

column 17, line 42, change "a" to --an--.

In Claim 16:

column 18, line 26, change "extending" to --extended--.

In Claim 22:

column 18, line 61, change "through" to --with the intermediary of--.

Signed and Sealed this

Eleventh Day of March, 1997

Attest:

BRUCE LEHMAN

Attesting Officer

Commissioner of Patents and Trademarks